(12) United States Patent  
Chen et al.

(10) Patent No.: US 11,687,209 B2  
(45) Date of Patent: Jun. 27, 2023

(54) DISPLAY METHOD AND APPARATUS FOR DISPLAYING DISPLAY EFFECTS

(71) Applicant: Beijing SenseTime Technology Development Co., Ltd., Beijing (CN)

(72) Inventors: Chen Chen, Beijing (CN); Qinqin Xu, Beijing (CN); Ran Tao, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/914,669

(22) Filed: Jun. 29, 2020

(65) Prior Publication Data  
US 2020/0326830 A1    Oct. 15, 2020

Related U.S. Application Data

(63) Continuation of application No. PCT/CN2019/127975, filed on Dec. 24, 2019.

(30) Foreign Application Priority Data

Feb. 27, 2019   (CN) .......................... 201910146580.8

(51) Int. Cl.  
G06F 3/04812  (2022.01)  
G06F 3/01     (2006.01)

(52) U.S. Cl.  
CPC .......... G06F 3/04812 (2013.01); G06F 3/011 (2013.01)

(58) Field of Classification Search  
None  
See application file for complete search history.

(56) References Cited

U.S. PATENT DOCUMENTS

| 2011/0022958 | A1 | 1/2011 | Kang |
| 2015/0082231 | A1 | 3/2015 | Ren et al. |
| 2015/0201161 | A1 | 7/2015 | LaChapelle et al. |
| 2017/0140214 | A1* | 5/2017 | Matas ................. G06K 9/00302 |
| 2018/0336714 | A1* | 11/2018 | Stoyles ................ G11B 27/036 |

(Continued)

FOREIGN PATENT DOCUMENTS

| CN | 102436668 A | 5/2012 |
| CN | 103500049 A | 1/2014 |
| CN | 105975935 A | 9/2016 |

(Continued)

OTHER PUBLICATIONS

First Office Action of the Chinese application No. 201910146580.8, dated May 7, 2020, 20 pgs.

(Continued)

*Primary Examiner* — Amare Mengistu  
*Assistant Examiner* — Sarvesh J Nadkarni  
(74) *Attorney, Agent, or Firm* — Cooper Legal Group, LLC

(57) ABSTRACT

A display method, an electronic device, and a storage medium are provided. The method includes: detecting state information of a first object; if the state information indicates that the first object appears or disappears, determining whether a trigger condition is satisfied according to the state information; and if the trigger condition is satisfied, transforming display of a second object according to a trigger event corresponding to the trigger condition, where the second object is independent of the first object.

15 Claims, 10 Drawing Sheets

(56) References Cited

U.S. PATENT DOCUMENTS

| | | | |
|---|---|---|---|
| 2019/0132642 A1 | 5/2019 | Wang et al. | |
| 2021/0366163 A1 | 11/2021 | Lin et al. | |

FOREIGN PATENT DOCUMENTS

| | | | |
|---|---|---|---|
| CN | 107291427 A | 10/2017 | |
| CN | 107464291 A | 12/2017 | |
| CN | 107852443 A | 3/2018 | |
| CN | 107911614 A | 4/2018 | |
| CN | 108540863 A | 9/2018 | |
| CN | 108876877 A | 11/2018 | |
| CN | 108958610 A | 12/2018 | |
| CN | 109195001 A | 1/2019 | |
| CN | 109275016 A | 1/2019 | |
| CN | 109885231 A | 6/2019 | |
| JP | 2000322231 A | 11/2000 | |
| JP | 2011186730 A | 9/2011 | |
| JP | 2014085967 A | 5/2014 | |
| JP | 2015534693 A | 12/2015 | |
| JP | 2017130201 A | 7/2017 | |
| JP | 2018181256 A | 11/2018 | |
| KR | 20140130675 A | 11/2014 | |
| KR | 20170084443 A | 7/2017 | |
| WO | 2018072652 A1 | 4/2018 | |

OTHER PUBLICATIONS

International Search Report in the international application No. PCT/CN2019/127975, dated Mar. 25, 2020, 2 pgs.
First Office Action of the Japanese application No. 2020-535496, dated Aug. 31, 2021, 10 pgs.
Second Office Action of the Chinese application No. 201980004839.3, dated Jun. 16, 2021, 22 pgs.
First Office Action of the Korean application No. 10-2020-7018870, dated Jul. 16, 2021, 12 pgs.
Second Office Action of the Korean application No. 10-2020-7018870, dated Jan. 14, 2022, 9 pgs.
Notice of Allowance of the Singaporean application No. 11202006337S, dated Aug. 20, 2022, 9 pgs.
Third Office Action of the Japanese application No. 2020-535496, dated Nov. 1, 2022, 6 pgs.

* cited by examiner

US 11,687,209 B2

DISPLAY METHOD AND APPARATUS FOR DISPLAYING DISPLAY EFFECTS

CROSS REFERENCE TO RELATED APPLICATIONS

The present application is a continuation of International Patent Application No. PCT/CN2019/127975, filed on Dec. 24, 2019, which claims priority to Chinese Patent Application No. 201910146580.8, filed on Feb. 27, 2019. The disclosures of International Patent Application No. PCT/CN2019/127975 and Chinese Patent Application No. 201910146580.8 are hereby incorporated by reference in their entireties.

BACKGROUND

With the development of display technologies, the display effects of electronic devices become more and more diverse, and the display effects displayed also become more and more abundant. However, requirements of users for display effects also become more and more diverse. How to further enrich the display diversity of an electronic device and satisfy individual requirements of a user is a technical problem that needs to be further solved by the prior art.

SUMMARY

The present disclosure relates to the field of display technologies, and in particular, to a display method and apparatus, an electronic device, and a storage medium.

A first aspect of the embodiments of the present disclosure provide a display method, including: detecting state information of a first object; determining whether the state information satisfies a first trigger condition; and transforming, in response to determining that the state information satisfies a first trigger condition, display of a second object according to a trigger event corresponding to the first trigger condition, where the second object is independent of the first object.

A second aspect of the embodiments of the present disclosure provide a display apparatus, including: a detection module, configured to detect state information of a first object; a first determination module, configured to determine whether the state information satisfies a first trigger condition; and a transform module, configured to transform, in response to the first determination unit determining that the state information satisfies the first trigger condition, display of a second object according to a trigger event corresponding to the first trigger condition, where the second object is independent of the first object.

A second aspect of the embodiments of the present disclosure provide a display device, including: a display; a memory; and a processor, respectively connected to the display and the memory, and configured to execute computer executable instructions on the memory to control operations of the display and the memory, and to implement the display method provided by the first aspect of the present disclosure.

A computer storage medium, where the computer storage medium stores computer executable instructions; where the computer executable instructions, when being executed by a computer, enable the computer to implement the display method provided by the first aspect of the present disclosure.

According to the technical solutions provided by the embodiments of the present disclosure, the state information of the first object is detected, and if the state information indicates that the first object appears or disappears, the display of the other one, i.e., the second object, independent of the first object is transformed, thereby implementing, by means of the appearance or disappearance of one object, the transform of the predetermined display of the other one, i.e., the second object. Thus, the display form of the second object is enriched and the display control is enriched, and the individual requirements of users may be better satisfied.

DETAILED DESCRIPTION

The technical solutions of the present disclosure are further described in detail below with reference to the accompanying drawings and specific embodiments of the specification.

Figure 1:
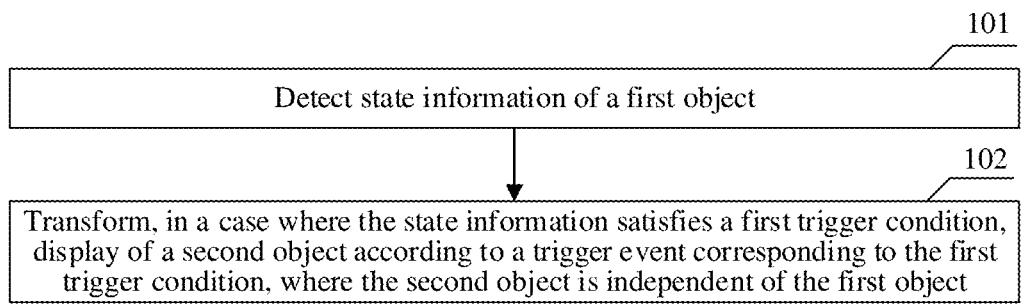
FIG. 1 is a schematic flowchart of a display method provided by the embodiments of the present disclosure.

As shown in FIG. 1, the embodiments provide a display method, which includes the following operations.

At 101, state information of a first object is detected.

The display method provided by the embodiments may be applied to various display devices. The electronic device may include a display screen, and the display screen may be a liquid crystal display screen, a projection display screen, an organic light emitting diode (OLED) display, or an electronic ink display screen.

In some embodiments, the state information includes: first display state information for indicating a current display state of a display interface, and/or acquisition state information for indicating a current acquisition state of an image acquisition module; and
the first trigger condition includes: a display state trigger condition corresponding to the first display state information, and/or an acquisition state trigger condition corresponding to the acquisition state information.

In some embodiments, detecting the state information of the first object is: detecting second display state information of the first object currently displayed on the display interface.

In some embodiments, the operation of detecting the state information of the first object includes: detecting device state information of a display device, where the display device is the first object.

At 102, in response to determining that the state information satisfies a first trigger condition, display of a second object is transformed according to a trigger event corresponding to the first trigger condition, where the second object is independent of the first object.

Because the detected state information of the first object is different in different embodiments, multiple embodiments are combined subsequently to introduce how to determine whether the state information satisfies the first trigger condition. The trigger event may be used for triggering the display device to execute a specific action or a specific operation. In the embodiments, the trigger event is a trigger event of controlling the display of the second object, or the trigger event is a related event of triggering the display device to execute the display of the second object. In the embodiments, there are multiple implementation manners of transforming the display of the second object according to the trigger event corresponding to the first trigger condition. Details are described later.

In some embodiments, the independence that the first object is independent of the second object is embodied in any one of the following aspects.

(1) The display control logic of the first object and the second object is independent of each other when no trigger event exists. For example, when no trigger event exists, the display starting, the display pausing, the display manner, and the like of the second object are all not related to the current display state of the first object.

(2) The first object is different from the second object. For example, there is no inclusion relationship between the first object and the second object.

(3) The first object and the second object may be different types of objects. For example, the first object is a single image and the second object may be a video, or the second object is a single image and the first object is a video; for another example, the first object may be a displayed graphic object and the second object may be an acquisition object, or the first object is an acquisition object and the second object is a displayed graphic object. If the first object is an acquisition object, the state information of the first object in operation S110 is that the first object appears in or disappears from an acquisition region. The acquisition region may be a region corresponding to an acquisition view of the image acquisition module, and the display device may obtain state information indicating a state, such as appearance or disappearance, of the first object, according to an image acquired by the image acquisition module.

(4) The first object and the second object come from different files. For example, the first object and the second object do not belong to the same video or the like except for the association in the trigger event, and do not necessarily appear on the same display interface at the same time.

For example, both the first object and the second object may be graphic objects, for example, graphic objects displayed on the current display interface. Of course, in the embodiments, multiple graphic objects may be displayed on the display interface. In addition to the first object and/or the second object, other graphic objects may also be included. The graphic object may be a static graphic object and a dynamic graphic object. In the embodiments, both the first object and the second object may be dynamic graphic objects. The dynamic graphic object may include: an animation effect, a video, an animated image, etc.

Figure 2:
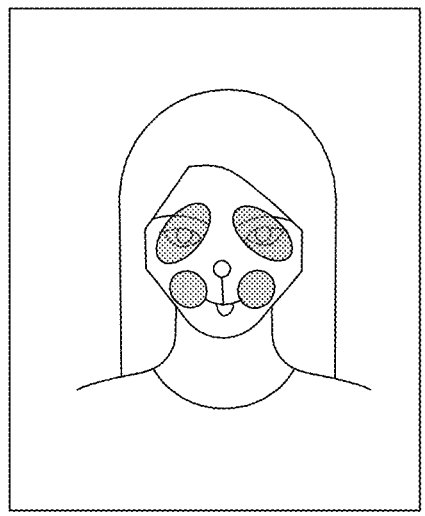
FIG. 2 is a schematic diagram of a first display effect provided by the embodiments of the present disclosure.

For another example, at least one or both of the first object and the second object may be a map, and the map may be a graphic object covering the entire display interface or a part of the display interface. For example, the map may be a face map covering a portrait face region in the display interface. The face map may include various forms of stickers, for example, stickers of dramatic elements (for example, Peking opera masks) and/or various stickers of an entertainment nature. The image shown in FIG. 2 displays an interesting map covering the portrait face.

In some embodiments, both the first object and the second object may be display objects, and/or both the first object and the second object may be acquisition objects. Exemplarily, the display objects are preset special effects, graphics, etc. Exemplarily, the acquisition objects are images acquired by an image acquisition device, for example, face images, etc.

In the embodiments of the present application, on the basis of association control between two independent graphic objects, the display of the second object is transformed when the state information of the first object satisfies the first trigger condition. The display control manner of a graphic interface is enriched, and the control manner of the graphic objects is improved.

The foregoing embodiments do not detail the implementation manners of transforming the display of the second object according to the trigger event corresponding to the first trigger condition. The following introduces several implementation manners of transforming the display of the second object.

In some embodiments, transforming the display of the second object according to the trigger event corresponding to the first trigger condition includes at least one of the following:

ending the display of the second object early according to the trigger event;

shortening a display duration of the second object according to the trigger event;

extending the display duration of the second object according to the trigger event;

adjusting display parameters of the second object according to the trigger event;

adjusting display content of the second object according to the trigger event; or adjusting a disappearing manner of the second object according to the trigger event, for example, the second object disappears from the display interface in a manner of gradually fading out, or the second object disappears from the display interface in a manner of moving out from one side;

pausing the display of the second object according to the trigger event; and controlling, according to the trigger event, the $n^{th}$ sub-object currently displayed of the second object to switch to the $(n+1)^{th}$ sub-object of the second object for display.

For example, assuming that the second object is a video or animation containing N frames, when it is detected that the first trigger condition is satisfied, the $n^{th}$ frame of the second object is displayed, where n is less than N; if the trigger event is an trigger event of triggering the early end of the display of the second object, the display device no longer displays the $(n+1)^{th}$ frame of the second object, but directly ends the display at the $n^{th}$ frame.

There are multiple manners of extending the display duration of the second object, and several optional manners are provided below:

playing the second object at a first rate lower than a standard rate, so that the play duration of the second object is extended; and playing all or some of the frames of the second object repeatedly, so as to extend the display of the second object in a manner of replaying at least some of the frames.

There are multiple manners of shortening the display duration of the second object, and several optional manners are provided below:

playing the second object at a second rate higher than the standard rate, so that the display duration of the second object is shortened in a case where the second object is completely played; and displaying a key frame of the second object is displayed. For example, the second object is a video and/or an animation. In the embodiments, in order to shorten the display duration of the second object, only a preset key frame is displayed; thus, if the last frame of the second object is a key frame, in the solution of shortening the display duration of the second object, some intermediate frames of the second object may be skipped, but the last frame is still displayed.

The display parameter may be various parameters for controlling the display effect of the second object. For example, the display parameter includes, but is not limited to, at least one of the following:

a color parameter for controlling the display color of the second object;

a brightness parameter for controlling the display brightness of the second object; and a display rate parameter for controlling the switching rate of the second object.

In conclusion, in the embodiments, the display of the second object independent of the first object is controlled by using the state information of the first object. In this way, the display control manner of the second object is increased, the display form and change of the second object are enriched, the display logic and display effect of the display interface are increased, the user experience is improved, and the individual requirements of users are satisfied.

Pausing the display of the second object is different from stopping the display of the second object, and pausing the display of the second object includes:

storing the display state of the second object before paused;

pausing the display of the second object; and if a display resuming condition is satisfied, continuing the display of the second object according to the display state of the second object before paused.

In some embodiments, transforming, in response to determining that the state information satisfies the first trigger condition, the display of the second object according to the trigger event corresponding to the first trigger condition is: pausing, if the first trigger condition is satisfied, the display of the second object according to the trigger event corresponding to the first trigger condition; and the method further includes: continuing the paused display of the second object if redetected state information of the first object does not satisfy the first trigger condition.

For example, if it is detected that the first object appears, the display of the second object that is being currently played is paused; if the state information of the first object is continued to be detected, and if the detected state information indicates that the first trigger condition is not currently satisfied, the display of the second object is resumed, and in this case, the display is continued on the screen where the second object is paused.

In some embodiments, the display state of the second object at the moment of pause is maintained while the display of the second object is paused.

For example, in some embodiments, the first object is an acquired user image, and the state information is an action state of the user. Then, if it is found from the acquired image that the user executes action A, the trigger event is satisfied, and the display of a small video is initiated; next, if it is found by image acquisition that the user does not execute the action A, it is considered that the first trigger condition is not currently satisfied, the display of the small video is paused, and the currently displayed image frame is stopped; an image of the user is reacquired, it is found by image detection that the user execute the action A again, then the small video is continued to be displayed from the paused image frame, and the execution is repeated until the small video is displayed completely.

If a trigger event of pausing the display of the second object is detected at the last frame of the second object such as a small video, pause is also performed at the displayed last frame of the second object; if it is detected again that the action or state satisfying the trigger event for pause disappears, the display of the second object is ended.

For example, the first object is an acquired mouth image of a user, the state information is an action state of the mouth of the user, and the second object is a hamburger image. Then, an action of the user of opening the mouth is detected by image acquisition; if the action of opening the mouth is detected, it is considered that the first trigger condition is satisfied; if the action of opening the mouth is not detected, it is considered that the first trigger condition is not satisfied. The second object may be a series of hamburger images; different hamburger images have different degrees of completeness to present the process that a hamburger is eaten.

For example, if it is detected by image acquisition that the user opens the mouth, the first hamburger image is displayed, hamburger images are switched while the user maintains the mouth open, and through the switching of the hamburger images, a visual effect of an hamburger from being complete to being eaten smaller and smaller is presented; before the last hamburger image, if it is found by image acquisition that the user closes the mouth, i.e., the trigger event of the display switching of the second object is not currently satisfied, the switching of the hamburger images is paused and the display of the current hamburger image is maintained; if it is detected again that the user opens the mouth, switching is continued backward on the basis of the previously paused hamburger image until all the hamburger images are switched completely. Therefore, the process of eating a hamburger is presented through the mouth opening and closing of the user and the switching of the hamburger images.

Another example is a small special effect of rain control; for example, the first object is a palm image of a user, the state information is an action state of the palm of a user, and the second object is a raining special effect. If it is detected by image acquisition that the palm of the user is opened, the raining special effect is maintained; if the palm of the user is switched from open to closed, the raining special effect is paused; and if the raining special effect presents drizzle at the time of pause, the drizzle special effect is continued to be maintained on an image device. If it is detected again by image acquisition that the palm of the user is open, the display is continued on the basis of maintaining the drizzle special effect.

In conclusion, in the embodiments, the second object includes multiple display states. For example, the following five states are provided:

starting display: display is performed in order from the first frame, and the first, second, third, fourth, fifth, sixth, seventh, eighth, and ninth frames displayed on a screen are always paused or stopped or displayed until the end;

stopping display: sequence frames disappear from the screen;

pausing at the first frame: only the first frame is displayed, and the first frame is always displayed on the screen until a trigger event triggers the end of the display, the resuming of the display, or the stop of the display;

pausing: stop at the current frame and keep displaying the current frame until a trigger event triggers the end of the display, the resuming of the display, or the stop of the display; and pausing at the last frame: only the last frame is displayed, and the last frame is always displayed until a trigger event triggers to the end of the display, the resuming of the display, or the stop of the display.

The five states above are equal or parallel, there is no certain order or priority order, and the five states above may be combined at will as needed.

The multiple states may be combined to form different state combinations, and several optional combination states are provided as follows:

starting display, pausing at the first frame, pausing at the current frame, pausing at the last frame, and ending the display;

starting display, and stopping display at the current frame;

starting display, stopping display at the current frame, hiding an image frame, and resuming display on the basis of the hidden image frame; and starting display, switching to the display of other objects, and resuming from the display of other objects to the display of the current object.

In the embodiments of the present application, there are various implementation manners of transforming the display of the second object according to the trigger event, and the implementation manners of transforming the display of the second object may be set according to actual needs, so as to satisfy the requirements of different users.

Because the state information of the first object detected in different embodiments is different, the manners of determining whether the state information satisfies the first trigger condition are different. The implementation manners of operations 101 and 102 are detailed below through more detailed embodiments.

Figure 3:
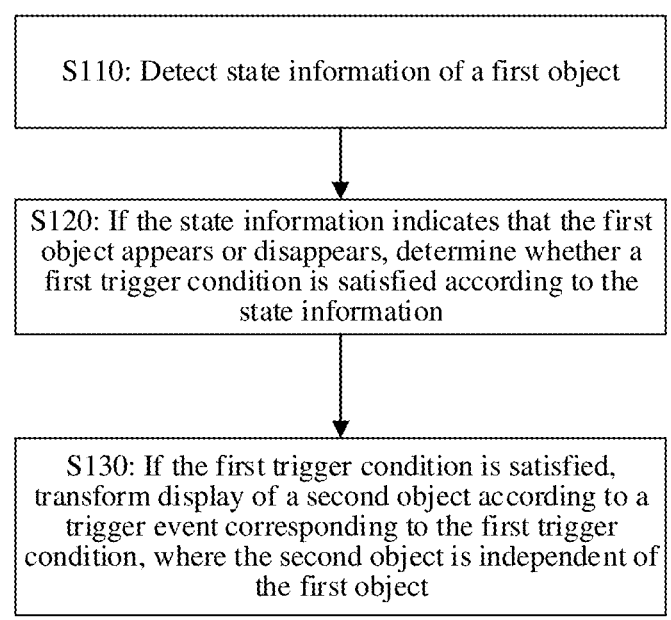
FIG. 3 is a schematic flowchart of another display method provided by the embodiments of the present disclosure.

FIG. 3 is a flowchart of another display method provided by the embodiments of the present application. The display method in FIG. 3 is a further refinement and improvement of the display method in FIG. 1. As shown in FIG. 3, the method includes the following operations.

At S110, the state information of the first object is detected.

At S120, if the state information indicates that the first object appears or disappears, whether the first trigger condition is satisfied is determined according to the state information.

Optionally, the operation 120 may be replaced with: if the state information indicates that the first object presents a predetermined action, determining that the first trigger condition is satisfied. For example, an action of nodding or raising the head of a portrait is acquired, or an action of opening the hand or making a first is acquired, it may be considered that a predetermined action is presented, thereby satisfying the specific first trigger condition.

At S130, in response to determining that the first trigger condition is satisfied, the display of the second object is transformed according to the trigger event corresponding to the first trigger condition, where the second object is independent of the first object.

In some embodiments, for the state information of the appearance or disappearance of the first object detected in the operation S110, the appearance or disappearance here includes: appearing or disappearing from the display interface.

If it is detected that the state information indicates that the first object appears or disappears, whether the first trigger condition is satisfied is determined according to the state information, and if the first trigger condition is satisfied, the trigger event corresponding to the first trigger condition is executed, thereby implementing display adjustment of the second object.

In some embodiments, the state information includes: first display state information for indicating a current display state of a display interface, and/or acquisition state information for indicating a current acquisition state of an image acquisition module; and the first trigger condition includes: a display state trigger condition corresponding to the first display state information, and/or an acquisition state trigger condition corresponding to the acquisition state information.

In some embodiments, the display method may be applied to a display device having a display, and moreover, the display device may include an image acquisition module such as a camera or be connected to an image acquisition module. The image acquisition module may acquire images.

In some embodiments, the first object and the second object may be display objects pre-stored in the display device, and may also be display objects received from other devices by the display device.

In some other embodiments, the first object and the second object may also be graphic objects acquired and displayed on the display in real time.

Hence, in the embodiments, according to different types of objects, the first trigger condition includes a display state trigger condition and/or an acquisition state trigger condition.

The trigger condition corresponding to one trigger event may be one or more; in some embodiments, the first trigger condition corresponding to the trigger event includes a display state trigger condition and/or an acquisition state trigger condition. When there are multiple trigger conditions corresponding to one trigger event, these trigger conditions need to satisfy a certain logical relationship, and the logical relationship include a logic "or" and/or a logic "and".

If the trigger condition corresponding to one trigger event is the logic "and", the execution of the trigger event requires that the multiple trigger conditions corresponding to the trigger event are all satisfied. If the trigger condition corresponding to one trigger event is the logic "or", the trigger condition that needs to be satisfied before the trigger event is executed may be one trigger condition connected by the logic "or".

In conclusion, in the embodiments, the first trigger condition is at least divided into two categories, i.e., the display state trigger condition and the acquisition state trigger condition. The display adjustment of the second object described in the embodiments may be based on either one of the display state trigger condition and/or the acquisition state trigger condition; thus, both a display state and/or an acquisition state may adjust the display of the second display by the display device.

In some embodiments, the operation S120 may include: if the detected first display state information indicates that the first object appears on the display interface, determining that the display state trigger condition (corresponding to the first trigger condition) is satisfied; or if the detected acquisition state information indicates that the first object disappears from the acquisition region, determining that the acquisition state trigger condition (corresponding to the first trigger condition) is satisfied.

The first display state information is description information of the display state of the first object. For example, the first display state information includes at least one of the following:

start state information indicating the start of the display of the first object;

end state information indicating the end of the display of the first object; and display progress state information indicating the current display progress of the first object. For example, the display progress state information may be used for indicating display to the $M^{th}$ frame of the video or animation, duration of the previous display, and duration of the subsequent display. For another example, the display progress state information may also be used for indicating display to the $S^{th}$ map in a map sequence.

In conclusion, the first display state information may be various types of information indicating the display state of the first object, and is not limited to the examples above.

In some embodiments, the operation S120 may include: if the first object appears on the display interface, considering that the display state trigger condition is satisfied, i.e., the appearance of the first object transforms the display of the second object. For example, both the first object and the second object may be special effects formed in the form of a video or animation. By executing the display method provided by the embodiments, when one special effect appears, the display of the other special effect is transformed.

In some embodiments, the first object is any object other than the second object (i.e., the first object is a random object relative to the second object). That is, if other objects are inserted and displayed during the display of the second object, a second feature transforms the display of the second object. Such a transform includes, but is not limited to: stopping display, pausing display, accelerating display, decelerating display, transforming a display exit manner, etc.

In still other embodiments, the first object is an object having a certain characteristic rather than a random object. For example, the first object may be an object that partially interferes with the display of the second object, and/or an object that has a pre-established binding relationship with the second object, but the satisfaction of the binding relationship is only limited to the first trigger condition being satisfied.

The trigger event may be used for triggering the display device to execute a specific action or a specific operation. In the embodiments, the trigger event is a trigger event of controlling the display of the second object, or the trigger event is a related event of triggering the display device to execute the display of the second object.

In the embodiments, the appearance or disappearance of the first object serves as a trigger event for the display transform of the second object.

In some embodiments, the display device controls the display of the second object according to a first control logic; and if a trigger event that satisfies the first trigger condition is detected, the display device controls the display of the second object according to a second control logic. The first control logic and the second control logic are different. The first control logic is a pre-defined control logic, and the second control logic at least includes a control logic of the second object corresponding to the operation or action corresponding to the trigger event.

In some embodiments, the operation S130 may include: switching from the first control logic to the second control logic to control the display of the second object, thereby transforming the display of the second object.

Transforming the display of the second object in the operation S130 includes at least one of the following:

ending the display of the second object early according to the trigger event;

shortening the display duration of the second object according to the trigger event;

extending the display duration of the second object according to the trigger event;

adjusting display parameters of the second object according to the trigger event;

adjusting display content of the second object according to the trigger event; or adjusting a disappearing manner of the second object according to the trigger event.

In some embodiments, the operation S130 may include: controlling the display of the currently displayed second object on the display interface to be stopped according to the trigger event corresponding to the display state trigger condition (i.e., the first trigger condition).

Hence, when the display state trigger condition is satisfied, the display of the second object is controlled to be stopped. Thus, the cut-in display of the first display object automatically stops the display of the second object. In this case, when the display of the second object is stopped, the display of the second object may be not completed according to the previous first control logic, or the number of times of display may not reach a predetermined number of times.

If the appearance (i.e., the start of display) of the first object automatically ends of the display of the second object, associated control based on the appearance or disappearance of two independent graphic objects is implemented; the display control manner of the graphic interface is enriched and the control manner of the graphic objects is improved.

In some embodiments, the operation S130 may include: if the first trigger condition is satisfied, controlling the $n^{th}$ sub-object currently displayed of the second object to switch to the $(n+1)^{th}$ sub-object of the second object for display. Here, n is a positive integer less than N, and N is the total number of sub-objects included in the second object.

The second object includes multiple sub-objects. If the first trigger condition is satisfied, the second object is switched between different sub-objects, for example, from the currently displayed sub-object to the next sub-object.

In some embodiments, if the $N^{th}$ sub-object is currently displayed, it is possible to control the $N^{th}$ sub-object to switch to the first sub-object of the second object to achieve cyclic switching.

In some embodiments, if the state information indicates that the first object appears or disappears, determining whether the first trigger condition is satisfied according to the state information includes:

determining that the acquisition state trigger condition is satisfied if the detected acquisition state information indicates that the first object disappears from the acquisition region.

If the first object may disappear from the acquisition region, the image acquisition module cannot acquire the first object from the acquisition region, so that the first object disappears from the display interface.

In some embodiments, the disappearance of the first object from the acquisition region is also regarded as a type of state information that satisfies the first trigger condition. Thus, the disappearance of the first object from the acquisition region triggers the start of the display of the second object, but is not a reverse process of adding an object to the acquisition region to trigger the start of the display of the second object. Hence, the operation S130 may include: controlling the display of the second object to start on the display interface according to the trigger event corresponding to the acquisition state trigger condition (i.e., the first trigger condition). An example of the display interface corresponding to the method in FIG. 3 is described below with reference to the drawings.

Figure 4:
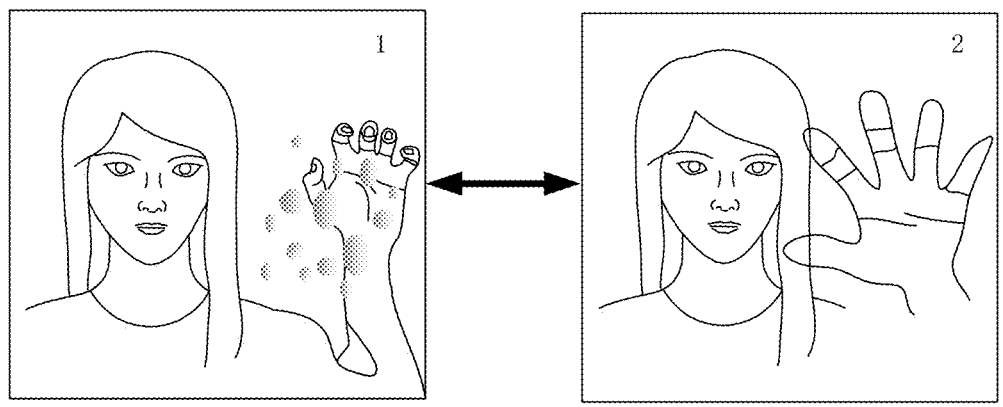
FIG. 4 is a schematic diagram of a second display effect provided by the embodiments of the present disclosure.

The first object shown in FIG. 4 includes imaging of a hand in the shape of a claw; the second object is a special effect of absorbing a target object (for example, particles such as beans); in the right picture of FIG. 4, imaging of an open palm appears, and the special effect of absorbing a target object disappears; while in the left picture of FIG. 4, imaging of the hand in the shape of a claw appears, and the special effect of absorbing a target object is presented. Thus, the appearance or disappearance of the imaging of the hand in the shape of a claw implements a control event of controlling whether the special effect of absorbing a target object occurs.

Figure 5:
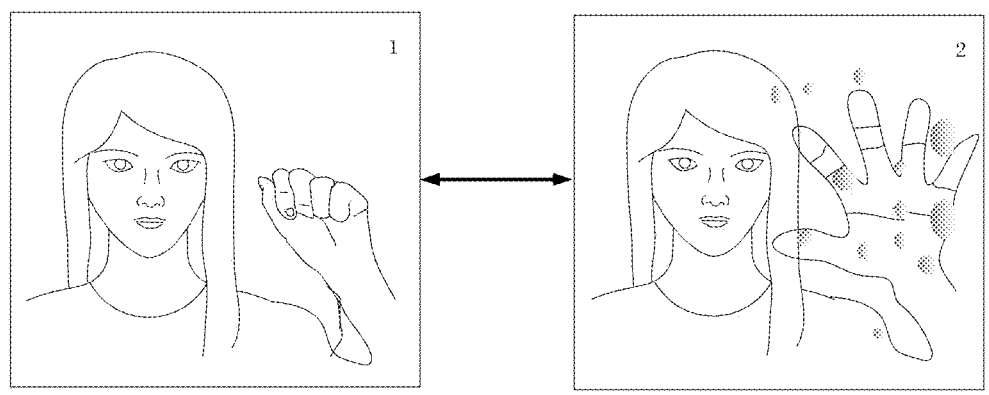
FIG. 5 is a schematic diagram of a third display effect provided by the embodiments of the present disclosure.

FIG. 5 is a schematic diagram of controlling changes of a display interface on the basis of a display method provided by the embodiments. The first object in FIG. 4 is the imaging of acquiring an open gesture of the palm of the user; the second object is a special effect of sprinkling the target object (for example, particles such as beans). As shown in FIG. 5, if the imaging of the open gesture of the palm appears on the display interface, the special effect of sprinkling the target object is displayed; and if the imaging of the open gesture of the palm disappears on the display interface, the special effect of sprinkling the target object also disappears.

In some embodiments, detecting the state information of the first object is: detecting second display state information of the first object currently displayed on the display interface. The following introduces a display method that is more detailed than the display method in FIG. 1 according to the embodiments of the present application.

Figure 6:
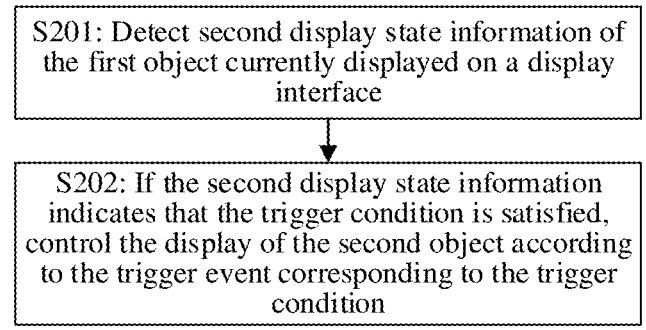
FIG. 6 is a schematic flowchart of another display method provided by the embodiments of the present disclosure.

As shown in FIG. 6, the embodiments provide another display method, which includes the following operations.

At S201, second display state information of the first object currently displayed on the display interface is detected (corresponding to operation 101).

At S202, if the second display state information satisfies the first trigger condition, the display of the second object is controlled according to the trigger event corresponding to the first trigger condition, where the second object is different from the first object and the second object is independent of the first object (corresponding to operation 102).

In some embodiments, the display state of the first object is detected, and the information indicating the display state of the first object is the second display state information. If the second display state information satisfies the first trigger condition, the display of the second object is triggered.

In the embodiments, the difference between the first object and the second object is embodied in that the first object and the second object are different objects of the same type.

In some embodiments, the operations in the display method in FIG. 6 may be applied to the display method in FIG. 1. That is, the display method in FIG. 1 further includes the following operations S201 and S202.

In the embodiments, both the first object and the second object are special effects. Thus, after the display of one special effect is finished, the other special effect independent of the previous finished special effect is automatically played. For example, during the playback of one special effect, the other special effect is automatically inserted or synchronously played.

Specifically, for example, the operation S202 may include at least one of the following:

if the second display state information satisfies a synchronous display trigger condition (corresponding to the first trigger condition), controlling synchronous display of the first object and the second object according to a synchronous display trigger event; or if the second display state information satisfies an associated display trigger condition (corresponding to the first trigger condition), initiating the display of the second object according to the associated display trigger condition when the first object is displayed to a predetermined state.

In the embodiments, the first trigger condition that the second display state information may satisfy at least includes: a synchronous display trigger condition and an associated display trigger condition.

If the second display state information satisfies the synchronous display trigger condition, the display of the second object is initiated while the display of the first object is initiated. The first object and the second object may be displayed side by side on the graphic interface.

In some embodiments, the synchronous display includes: displaying the first object in a first region and displaying the second object in a second region synchronously. The first region is different from the second region; the first region and the second region may be laterally arranged side by side, or may also be longitudinally arranged in a ratio. In some embodiments, the first region and the second region may also be arranged diagonally. In some embodiments, the first region and the second region may partially overlap, or completely overlap. When the first region and the second region completely overlap, the first region may be a sub-region of the second region, or the second region may be a sub-region of the first region.

For example, the first object may be a graphic and/or video of the Santa Claus, and the second object may be a video of snowing. The image and/or video of the Santa Claus are displayed in a middle region of the display interface, and the video of snowing is displayed on the entire display interface simultaneously.

In some embodiments, the association trigger event mainly triggers associated control of the display of the first object and the second object. Hence, in the embodiments, if the first object is displayed to a predetermined state, for example, the display duration reaches a predetermined duration, and for another example, when the progress of the display reaches 50% or the display reaches a specific frame, the display of the second object is initiated. In the embodiments, the display of the first object and the second object may be in the same region, or may be in different regions.

In some embodiments, detecting the state information of the first object is: detecting device state information of a display device, where the display device is the first object. The following introduces a display method that is more detailed than the display method in FIG. 1 according to the embodiments of the present application.

Figure 7:
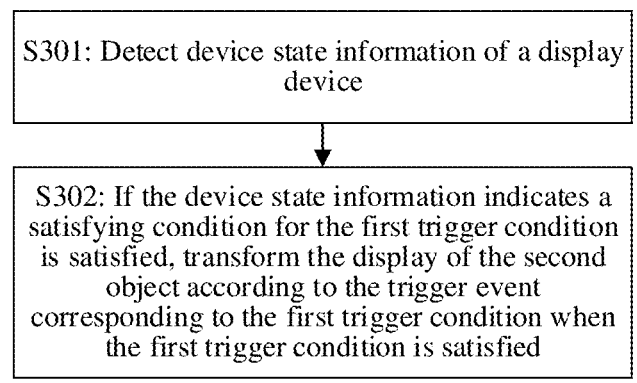
FIG. 7 is a schematic flowchart of another display method provided by the embodiments of the present disclosure.

As shown in FIG. 7, the embodiments provide still another display method, which includes the following operations.

At S301, device state information of a display device is detected (corresponding to the operation 101).

At S302, if the device state information indicates that a satisfying condition for the first trigger condition is satisfied, the display of the second object is transformed according to the trigger event corresponding to the first trigger condition when the first trigger condition is satisfied (corresponding to the operation 102).

The operations in the display method provided in the embodiments may be applied to the display method in FIG. 1, the display method in FIG. 3, and the display method in FIG. 6. That is, the display methods in FIG. 1, FIG. 3, and FIG. 6 further include the following operations: detecting the device state information of the display device; and if the device state information indicates a satisfying condition for the first trigger condition is satisfied, transforming the display of the second object according to the trigger event corresponding to the first trigger condition when the first trigger condition is satisfied.

In the embodiments, the display device also detects the device state information, determines whether the first trigger condition is satisfied in combination with the device state, and executes the trigger event corresponding to the satisfied first trigger condition only when the first trigger condition is satisfied.

In some embodiments, the device state information includes at least one of the following:

device display state information indicating a current display state of the display device;

environment state information indicating an environment in which the display device is currently located; or resource state information indicating a current resource state of the display device.

The device display state information may include at least one of the following:

content indication information indicating current display content of the display device; or mode indication information indicating a current display mode of the display device.

For example, the satisfying condition for the first trigger condition is that: the first trigger condition is satisfied only when specific content is displayed; for another example, the satisfying condition for the first trigger condition is that: only in a specific display mode of the display device, the corresponding first trigger condition is satisfied.

The specific content may include a specific type of content and/or a certain specific display content. For example, if the specific type is a special effect or a sticker, the display device currently displays the special effect or the sticker, then it is considered that the display device satisfies the first trigger condition. If the display device may display content A, content B, and content C, the satisfying condition for the first trigger condition is that: when the display device displays content B, it is determined that the first trigger condition is satisfied. Hence, if the display device displays content B at the current moment, the first trigger condition is satisfying, and after the first trigger condition is satisfied, the trigger event corresponding to the satisfying and satisfied first trigger condition is executed, so that the display of the second object is controlled and/or adjusted.

In some embodiments, if the first object is a first animation effect, the second object is a second animation effect; or, if the first object is a first graph, the second object is a second graph.

The display mode of the display device at least includes a full-screen display mode and a small-screen display mode. If the display mode is the full-screen display mode, the entire screen of the display device displays a display interface containing any one of the first to second objects; and if the display mode is the small-screen display mode, the display area of the display interface is smaller than that of the display screen or smaller than a predetermined ratio of the display screen. The predetermined ratio may be 0.98, 0.95, 0.9, etc.

The environment state information includes, but is not limited to, at least one of the following:

weather information of the environment in which the display device is located; the weather information may indicate that it is currently a sunny day, rainy day, snowy day, or haze day;

temperature information of the environment in which the display device is located, for indicating the temperature of the environment;

humidity information of the environment in which the display device is located, for indicating the humidity of the environment; or typical geographic feature information of the environment in which the display device is located, for indicating the typical landforms or artificial features of the environment. For example, if the display device is a mobile device and the current location is Sanya, the typical geographic feature is the seaside.

In the embodiments, whether certain trigger events are satisfied is determined according to the environment state information of the environment in which the display device is located.

Exemplarily, if the first trigger condition is satisfied, the trigger event corresponding to the satisfied first trigger condition is to trigger the display of a snowing animation. When the weather is very cold, displaying the snowing animation may increase the sense of coldness of the user. Hence, in this case, it is possible to set that the satisfying condition for the first trigger condition cannot be satisfied, so that the first trigger condition cannot be satisfied. Even if an operation or built-in notification that causes the first trigger condition to be satisfied is detected, the corresponding trigger event cannot be executed.

In conclusion, in the embodiments, there are matching criteria for various types of device state information, and then the detected device state information is matched with the matching criteria. If they are matched and consistent, it may be considered that the first trigger condition is satisfied, otherwise it may be considered that the first trigger condition is not satisfied.

The resource state information may include:

a computing resource usage rate indicating a computing resource usage state;

a storage resource usage rate indicating a storage resource usage state;

a display resource usage rate indicating a display resource usage state; and a bandwidth resource usage rate indicating a bandwidth resource usage state.

In the embodiments, if it is determined that a predetermined resource usage condition is satisfied according to the resource state information, it is determined that the first trigger condition is satisfied, otherwise it may be considered that the first trigger condition is not satisfied.

Figure 8:
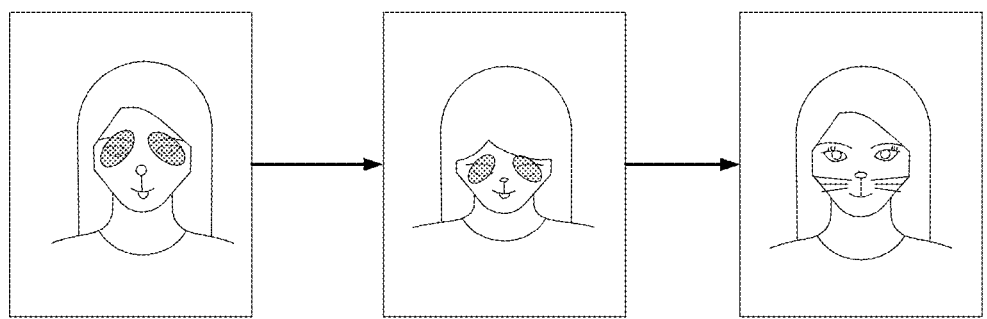
FIG. 8 is a schematic diagram of a fourth display effect provided by the embodiments of the present disclosure.

FIG. 8 is a schematic diagram of an effect of controlling display of a second object based on a display method provided by the embodiments of the present disclosure. FIG. 8 shows imaging of the head of a person, and FIG. 8 also shows maps pasted onto a face imaging region in an image. In FIG. 8, the first object may be imaging of nodding of a user, and the second object is a map in the face imaging region. If the imaging of nodding of the user appears on the display interface by means of image acquisition, it may be considered that the first trigger condition is satisfied, and then the control of the second object is executed according to the trigger event corresponding to the first trigger condition. In FIG. 8, the second object is the switching of the stickers in the face imaging region. After the imaging of nodding is detected, a sticker in a face presentation region is switched. For example, a sticker in an eye imaging region in FIG. 8 is switched to a sticker in a cheek region.

In some embodiments, the display device may display multiple types of maps. When the trigger event is executed, the device state information currently displayed on the display device needs to be determined. If the device is currently displaying the $N^{th}$ sticker, it may be determined that the first trigger condition corresponding to the trigger event of displaying the $(N+1)^{th}$ sticker is satisfied, otherwise the first trigger condition corresponding to the trigger event of displaying the $(N+1)^{th}$ sticker is not satisfied.

Figure 9:
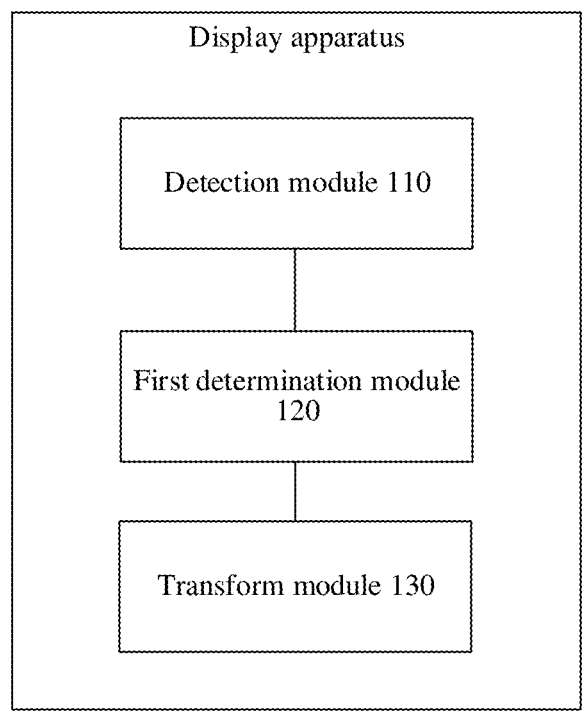
FIG. 9 is a schematic structural diagram of a display apparatus provided by the embodiments of the present disclosure.

As shown in FIG. 9, the embodiments provide a display apparatus, including:

a detection module 110, configured to detect state information of a first object;

a first determination module 120, configured to determine whether the state information satisfies a first trigger condition; and a transform module 130, configured to transform, in response to the first determination unit determining that the state information satisfies the first trigger condition, display of a second object according to a trigger event corresponding to the first trigger condition, where the second object is independent of the first object.

In some embodiments, the detection module 110, the first determination module 120, and the transform module 130 may be program modules. After the program modules are executed by a processor, the detection of the state information, the determination of the satisfaction of the first trigger condition, and the display transform of the second object may be implemented.

In still other embodiments, the detection module 110, the first determination module 120, and the transform module 130 may be soft and hard combination modules, and the soft and hard combination modules may be programmable arrays; the programmable arrays may be complex programmable arrays or field programmable arrays.

In still other embodiments, the detection module 110, the first determination module 120, and the transform module 130 may be pure hardware modules, and the pure hardware modules may be application-specific integrated circuits.

In some embodiments, the state information includes: first display state information for indicating a current display state of a display interface, and/or acquisition state information for indicating a current acquisition state of an image acquisition module; and the first trigger condition includes: a display state trigger condition corresponding to the first display state information, and/or an acquisition state trigger condition corresponding to the acquisition state information.

In some embodiments, the first determination module 120 is specifically configured to determine that the first trigger condition is satisfied if the detected first display state information indicates that the first object appears on the display interface.

In some embodiments, the transform module 130 is configured to control the display of the currently displayed second object on the display interface to be stopped according to the trigger event corresponding to the display state trigger condition.

In some embodiments, the first determination module 120 is specifically configured to determine that the first trigger condition is satisfied if the detected acquisition state information indicates that the first object disappears from an acquisition region.

In some embodiments, the first determination module 120 is specifically configured to control the display of the second object to be started on the display interface according to the trigger event corresponding to the acquisition state trigger condition.

In some embodiments, the first determination module is specifically configured to determine that the first trigger condition is satisfied if the state information indicates that the first object indicates a predetermined action.

In some embodiments, the transform module is specifically configured to, if the first trigger condition is satisfied, control the $n^{th}$ sub-object currently displayed of the second object to switch to the $(n+1)^{th}$ sub-object of the second object for display.

In some embodiments, the detection module 110 is specifically configured to detect second display state information of the first object currently displayed on the display interface; and the transform module is specifically configured to transform, in a case where the second display state information indicates that the first trigger condition is satisfied, the display of the second object according to the trigger event corresponding to the first trigger condition.

In some embodiments, the transform module is specifically configured to control, in a case where the second display state information satisfies a synchronous display trigger condition, synchronous display of the first object and the second object according to a synchronous display trigger event;

or, the transform module is specifically configured to initiate, in a case where the second display state information satisfies an associated display trigger condition, the display of the second object according to the associated display trigger condition when the first object is displayed to a predetermined state.

In some embodiments, the detection module is specifically configured to detect device state information of a display device, where the display device is the first object; and the first determination module is specifically configured to determine that the device state information satisfies the first trigger condition.

In some embodiments, the device state information includes at least one of the following:

device display state information indicating a current display state of the display device;

environment state information indicating an environment in which the display device is currently located; or resource state information indicating a current resource state of the display device.

In some embodiments, the transform module is specifically configured to pause, in a case where the state information satisfies the first trigger condition, the display of the second object according to the trigger event corresponding to the first trigger condition; and the transform module is further configured to continue the paused display of the second object in a case where redetected state information of the first object does not satisfy the first trigger condition.

In some embodiments, the transform module is specifically configured to end the display of the second object early according to the trigger event;

or the transform module is specifically configured to shorten a display duration of the second object according to the trigger event;

or the transform module is specifically configured to extend the display duration of the second object according to the trigger event;

or the transform module is specifically configured to adjust display parameters of the second object according to the trigger event;

or the transform module is specifically configured to adjust display content of the second object according to the trigger event;

or the transform module is specifically configured to adjust a disappearing manner of the second object according to the trigger event;

or the transform module is specifically configured to pause the display of the second object according to the trigger event.

In some embodiments, a control module is specifically configured to execute at least one of the following:

if the second display state information satisfies the synchronous display trigger condition, controlling synchronous display of the first object and the second object according to a synchronous display trigger event; or if the second display state information satisfies the associated display trigger condition, initiating the display of the second object according to the associated display trigger condition when the first object is displayed to a predetermined state.

In some embodiments, the apparatus further includes:

a detection module 110, configured to detect device state information of a display device; and the transform module 130, specifically configured to, if the device state information indicates that a satisfying condition for the first trigger condition is satisfied, transform the display of the second object according to the trigger event corresponding to the first trigger condition when the first trigger condition is satisfied.

In some embodiments, the transform module is specifically configured to, when the first trigger condition is satisfied, pause the display of the second object according to the trigger event corresponding to the first trigger condition; and the transform module is further configured to continue to the paused display of the second object if the redetected state information of the first object does not satisfy the first trigger condition.

Figure 10:
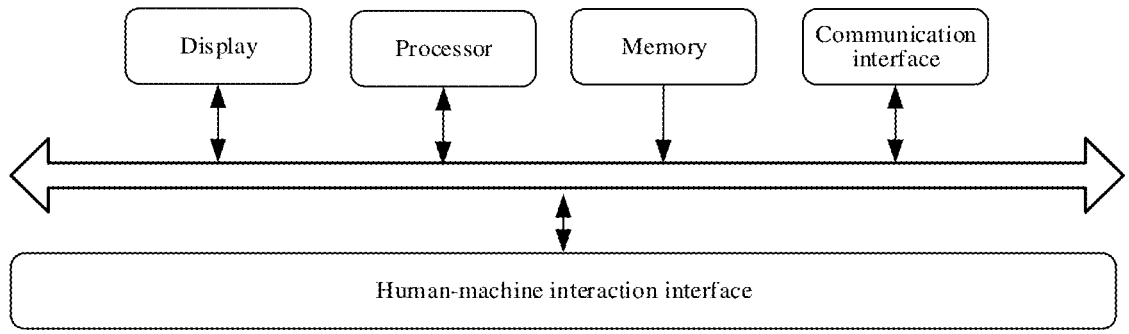
FIG. 10 is a schematic structural diagram of a display device provided by the embodiments of the present disclosure.

As shown in FIG. 10, the embodiments of the present application provide a display device, including:

a display used for displaying;

a memory used for storing information; and a processor, respectively connected to the display and the memory, and configured to implement, by executing computer executable instructions stored on the memory, the display method provided by one or more of the foregoing technical solutions, for example, the display methods shown in FIG. 1, FIG. 3, FIG. 6, and FIG. 7.

The memory may be various types of memory, for example, a Random Access Memory (RAM), a Read-Only Memory (ROM), a flash memory, etc. The memory may be used for information storage, for example, storing computer executable instructions, etc. The computer executable instructions may be various program instructions, for example, a target program instruction and/or a source program instruction.

The processor may be various types of processor, for example, a central processing unit, a microprocessor, a digital signal processor, a programmable array, a digital signal processor, an application specific integrated circuit, an image processor, etc.

The processor may be connected to the memory by means of a bus. The bus may be an integrated circuit bus or the like.

In some embodiments, a terminal device may further include a communication interface, and the communication interface may include a network interface, for example, a local area network interface, a transceiver antenna, etc. The communication interface is also connected to the processor and may be configured to receive and transmit information.

In some embodiments, the terminal device further includes a human-machine interaction interface. For example, the human-machine interaction interface may include various input and output devices, for example, a keyboard, a touch screen, etc.

The embodiments of the present application provide a computer storage medium. The computer storage medium stores computer executable codes; after the computer executable codes are executed, the display method provided by one or more of the foregoing technical solutions may be implemented, for example, the display methods shown in FIG. 1, FIG. 3, FIG. 6, and FIG. 7.

The storage medium includes: various media capable of storing program codes, such as a mobile storage device, an ROM, an RAM, a magnetic disk, or an optical disk. The storage medium may be a non-transient storage medium.

The embodiments of the present application provide a computer program product. The program product includes computer executable instructions; after the computer executable instructions are executed, the display method provided by any one of the foregoing embodiments may be implemented, for example, the display methods shown in FIG. 1, FIG. 3, FIG. 6, and FIG. 7.

It may be understood that the disclosed device and method in several embodiments provided in the present application may be implemented on other manners. The device embodiments described above are merely exemplary. For example, the unit division is merely logical function division and may be actually implemented in other division manners. For example, a plurality of units or components may be combined or integrated into another system, or some features may be ignored or not performed. In addition, the displayed or discussed mutual couplings or direct couplings or communication connections among the components may be implemented by means of some ports. The indirect couplings or communication connections between the devices or units may be electrical, mechanical, or in other forms.

The units described as separate components may or may not be physically separate, and the components displayed as units may or may not be physical units, i.e., may be located at one position, or may be distributed on a plurality of network units. Some or all of the units may be selected according to actual needs to achieve the objectives of the solutions of the embodiments.

In addition, the functional units in the embodiments of the present disclosure may be all integrated into one processing module, or each of the units may respectively serve as an independent unit, or two or more units are integrated into one unit, and the integrated unit may be implemented in the form of hardware, or may also be implemented in the form of a hardware and software function unit.

A person of ordinary skill in the art may understand that: all or some steps of implementing the forgoing embodiments of the method may be achieved by a program by instructing related hardware; the foregoing program may be stored in a computer readable storage medium; when the program is executed, steps including the foregoing embodiments of the method are performed; moreover, the foregoing storage medium includes various media capable of storing program codes, such as a mobile storage device, an ROM, an RAM, a magnetic disk, or an optical disk.

The descriptions above are only specific implementation manners of the present disclosure. However, the scope of protection of the present disclosure is not limited thereto. Within the technical scope disclosed by the present disclosure, any variation or substitution that would be easily conceived of by a person skilled in the art should all within the scope of protection of the present disclosure. Therefore, the scope of protection of the present disclosure may be defined by the scope of protection of the claims.

The invention claimed is:

1. A display method, comprising:
   detecting state information of a first object, wherein the first object comprises an image or a video displayed on a display interface;
   determining whether the state information satisfies a first trigger condition; and
   transforming, in response to determining that the state information satisfies the first trigger condition, display of a second object displayed on the display interface according to a trigger event corresponding to the first trigger condition, wherein the second object is independent of the first object,
   wherein transforming the display of the second object comprises: switching from a first control logic to a second control logic to control the display of the second object, wherein the first control logic and the second control logic are different, and the second control logic at least comprises a control logic of the second object corresponding to an operation or action corresponding to the trigger event,
   wherein the second control logic controlling the display of the second object according to the trigger event corresponding to the first trigger condition comprises at least one of the following:
      ending the display of the second object early according to the trigger event;
      shortening a display duration of the second object according to the trigger event;
      extending the display duration of the second object according to the trigger event;
      adjusting display parameters of the second object according to the trigger event; or
      adjusting a disappearing manner of the second object according to the trigger event,
   wherein the state information comprises at least one of: first display state information for indicating a current display state of the display interface, or acquisition state information for indicating a current acquisition state of an image acquisition module,
   wherein the first trigger condition comprises at least one of: a display state trigger condition corresponding to the first display state information, or an acquisition state trigger condition corresponding to the acquisition state information,
   wherein determining that the state information satisfies the first trigger condition comprises:
      determining that the first trigger condition is satisfied when the acquisition state information indicates that the first object disappears from an acquisition region.

2. The method according to claim 1, wherein detecting the state information of the first object comprises:
   detecting second display state information of the first object currently displayed on the display interface; and
   transforming, in the case where the state information satisfies the first trigger condition, the display of the second object according to the trigger event corresponding to the first trigger condition comprises:
      transforming, in a case where the second display state information indicates that the first trigger condition is satisfied, the display of the second object according to the trigger event corresponding to the first trigger condition.

3. The method according to claim 2, wherein transforming, in the case where the second display state information indicates that the first trigger condition is satisfied, the display of the second object according to the trigger event corresponding to the first trigger condition comprises at least one of the following:
   controlling, in a case where the second display state information satisfies a synchronous display trigger condition, synchronous display of the first object and the second object according to a synchronous display trigger event; or
   initiating, in a case where the second display state information satisfies an associated display trigger condition, the display of the second object according to the associated display trigger condition when the first object is displayed to a predetermined state.

4. The method according to claim 3, wherein the predetermined state comprises at least one of:
   the display duration reaching a predetermined duration;
   a progress of the display reaching 50%; or
   the display reaching a specific frame.

5. The method according to claim 1, wherein detecting the state information of the first object comprises:
   detecting device state information of a display device, wherein the first object further comprises the display device; and
   determining that the state information satisfies the first trigger condition comprises:
      determining that the device state information satisfies the first trigger condition,
   wherein the device state information comprises at least one of the following:
      device display state information indicating a current display state of the display device;
      environment state information indicating an environment in which the display device is currently located; or
      resource state information indicating a current resource state of the display device.

6. The method according to claim 1, wherein transforming, in response to determining that the state information satisfies the first trigger condition, the display of the second object according to the trigger event corresponding to the first trigger condition comprises:
   pausing, in response to determining that the state information satisfies the first trigger condition, the display of the second object according to the trigger event corresponding to the first trigger condition; and
   the method further comprises:
      continuing the display of the second object in response to determining that redetected state information of the first object does not satisfy the first trigger condition.

7. The method according to claim 1, wherein transforming the display of the second object according to the trigger event corresponding to the first trigger condition comprises:

controlling an $n^{th}$ sub-object currently displayed of the second object to switch to an $(n+1)^{th}$ sub-object of the second object for display.

8. The method according to claim 1, wherein the first display state information comprises at least one of:
start state information indicating start of display of the first object;
end state information indicating end of the display of the first object; or
display progress state information indicating a current display progress of the first object.

9. A display apparatus, comprising: a display, a memory, and a processor, the display, the memory, and the processor being connected to each other, wherein
the memory is configured to store computer instructions executable by the processor;
the processor is configured to:
detect state information of a first object, wherein the first object comprises an image or a video displayed on a display interface;
determine whether the state information satisfies a first trigger condition; and
control the display to transform, in response to determining that the state information satisfies the first trigger condition, display of a second object displayed on the display interface according to a trigger event corresponding to the first trigger condition, wherein the second object is independent of the first object,
wherein transforming the display of the second object comprises: switching from a first control logic to a second control logic to control the display of the second object, wherein the first control logic and the second control logic are different, and the second control logic at least comprises a control logic of the second object corresponding to an operation or action corresponding to the trigger event,
wherein for the second control logic controlling the display of the second object, the processor is configured to at least one of:
end the display of the second object early according to the trigger event;
shorten a display duration of the second object according to the trigger event;
extend the display duration of the second object according to the trigger event;
adjust display parameters of the second object according to the trigger event; or
adjust a disappearing manner of the second object according to the trigger event,
wherein the state information comprises at least one of:
first display state information for indicating a current display state of the display interface, or acquisition state information for indicating a current acquisition state of an image acquisition module,
wherein the first trigger condition comprises at least one of: a display state trigger condition corresponding to the first display state information, or an acquisition state trigger condition corresponding to the acquisition state information,
wherein the processor is configured to:
determine that the first trigger condition is satisfied when the acquisition state information indicates that the first object disappears from an acquisition region.

10. The apparatus according to claim 9, wherein the processor is configured to:

detect second display state information of the first object currently displayed on the display interface; and
control the display to transform, in a case where the second display state information indicates that the first trigger condition is satisfied, the display of the second object according to the trigger event corresponding to the first trigger condition.

11. The apparatus according to claim 10, wherein the processor is configured to:
control, in a case where the second display state information satisfies a synchronous display trigger condition, the display to synchronously display the first object and the second object according to a synchronous display trigger event;
or,
initiate, in a case where the second display state information satisfies an associated display trigger condition, the display to display the second object according to the associated display trigger condition when the first object is displayed to a predetermined state.

12. The apparatus according to claim 9, wherein the processor is configured to:
detect device state information of a display device, wherein the first object further comprises the display device; and
determine that the device state information satisfies the first trigger condition;
wherein the device state information comprises at least one of the following:
device display state information indicating a current display state of the display device;
environment state information indicating an environment in which the display device is currently located; or
resource state information indicating a current resource state of the display device.

13. The apparatus according to claim 9, wherein the processor is configured to control the display to:
pause, in response to determining that the state information satisfies the first trigger condition, the display of the second object according to the trigger event corresponding to the first trigger condition; and
continue the display of the second object in response to determining that redetected state information of the first object does not satisfy the first trigger condition.

14. The apparatus according to claim 9, wherein the processor is configured to:
control, when the first trigger condition is satisfied, the display to switch from an $n^{th}$ sub-object currently displayed of the second object to an $(n+1)^{th}$ sub-object of the second object for display.

15. A non-transitory computer storage medium, having stored thereon computer executable instructions, wherein the computer executable instructions, when being executed, enable to implement the following operations, comprising:
detecting state information of a first object, wherein the first object comprises an image or a video displayed on a display interface;
determining whether the state information satisfies a first trigger condition; and
transforming, in response to determining that the state information satisfies the first trigger condition, display of a second object displayed on the display interface according to a trigger event corresponding to the first trigger condition, wherein the second object is independent of the first object, wherein transforming the display of the second object comprises: switching from a first control logic to a second control logic to control the display of the second object, wherein the first control logic and the second control logic are different, and the second control logic at least comprises a control logic of the second object corresponding to an operation or action corresponding to the trigger event, wherein the second control logic controlling the display of the second object according to the trigger event corresponding to the first trigger condition comprises at least one of the following:

ending the display of the second object early according to the trigger event;

shortening a display duration of the second object according to the trigger event;

extending the display duration of the second object according to the trigger event;

adjusting display parameters of the second object according to the trigger event; or adjusting a disappearing manner of the second object according to the trigger event, wherein the state information comprises at least one of: first display state information for indicating a current display state of the display interface, or acquisition state information for indicating a current acquisition state of an image acquisition module, wherein the first trigger condition comprises at least one of: a display state trigger condition corresponding to the first display state information, or an acquisition state trigger condition corresponding to the acquisition state information, wherein determining that the state information satisfies the first trigger condition comprises:

determining that the first trigger condition is satisfied when the acquisition state information indicates that the first object disappears from an acquisition region.

* * * * *